US010761730B2

(12) United States Patent
Du

(10) Patent No.: US 10,761,730 B2
(45) Date of Patent: Sep. 1, 2020

(54) METHOD FOR CONFIGURING DISK ARRAY OF ELECTRONIC DEVICE AND RELATED ELECTRONIC DEVICE

(71) Applicant: Lenovo (Beijing) Co., Ltd., Beijing (CN)

(72) Inventor: Kehong Du, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/025,460

(22) Filed: Jul. 2, 2018

(65) Prior Publication Data

US 2019/0004705 A1 Jan. 3, 2019

(30) Foreign Application Priority Data

Jun. 30, 2017 (CN) .......................... 2017 1 0530863

(51) Int. Cl.
*G06F 3/06* (2006.01)
(52) U.S. Cl.
CPC .......... *G06F 3/0605* (2013.01); *G06F 3/0632* (2013.01); *G06F 3/0689* (2013.01)
(58) Field of Classification Search
CPC .... G06F 3/0605; G06F 3/0689; G06F 3/0632; G06F 3/0604
See application file for complete search history.

(56) References Cited

U.S. PATENT DOCUMENTS

| 5,422,890 A | * | 6/1995 | Klingsporn | ........... | G06F 11/008 |
| | | | | | 714/704 |
| 7,676,666 B2 | | 3/2010 | Lambert et al. | | |
| 2002/0101711 A1 | * | 8/2002 | Gold | ...................... | G06F 3/0614 |
| | | | | | 361/679.33 |
| 2005/0108474 A1 | * | 5/2005 | Zhang | ................... | G06F 3/0605 |
| | | | | | 711/114 |
| 2006/0083093 A1 | * | 4/2006 | Dover | .................. | G11C 7/1045 |
| | | | | | 365/222 |
| 2008/0059698 A1 | * | 3/2008 | Kabir | .................... | G06F 3/0605 |
| | | | | | 711/114 |
| 2013/0138934 A1 | * | 5/2013 | Lin | ........................ | G06F 9/4411 |
| | | | | | 713/1 |
| 2017/0090896 A1 | * | 3/2017 | Lin | ........................... | G06F 8/61 |
| 2018/0083834 A1 | * | 3/2018 | Rani | ................... | H04L 41/0846 |
| 2019/0182110 A1 | * | 6/2019 | Yang | ........................ | G06F 3/06 |

FOREIGN PATENT DOCUMENTS

| CN | 103136019 A | 6/2013 |
| CN | 106354430 A | 1/2017 |

* cited by examiner

*Primary Examiner* — Hiep T Nguyen
(74) *Attorney, Agent, or Firm* — Anova Law Group, PLLC

(57) ABSTRACT

One aspect of the present disclosure provides a method for configuring a disk array of an electronic device. The method includes: storing configuration information of the disk array; acquiring the stored configuration information if the electronic device is turned on; and configuring the disk array according to the configuration information.

18 Claims, 6 Drawing Sheets

METHOD FOR CONFIGURING DISK ARRAY OF ELECTRONIC DEVICE AND RELATED ELECTRONIC DEVICE

CROSS-REFERENCES TO RELATED APPLICATIONS

This application claims the priority of Chinese Patent Application No. 201710530863.3, entitled "Method for Configuring Disk Array of Electronic Device and Related Electronic Device", filed on Jun. 30, 2017, the entire contents of which is incorporated herein by reference.

FIELD OF THE DISCLOSURE

The present disclosure relates to the field of computer technologies and, more particularly, relates to a method for configuring a disk array of an electronic device and the related electronic device.

BACKGROUND

Redundant Array of Independent Disks (RAID), or "disk array", is an important storage component for an electronic device. Often, the configuration of RAID is mostly manually performed at the interface of the electronic device. However, configuring a large number of RAIDs would require a lot of time and human resource. In addition, manual configurations are prone to errors.

BRIEF SUMMARY OF THE DISCLOSURE

The disclosed method and system are directed to solve one or more problems set forth above and other problems.

One aspect of the present disclosure provides a method for configuring a disk array of an electronic device, comprising: storing configuration information of the disk array; acquiring the stored configuration information if the electronic device is turned on; and configuring the disk array according to the configuration information.

In some embodiments, the electronic device may include a Baseboard Management Controller (BMC), and the step of storing the configuration information of the disk array may include storing the configuration information of the array disk in the BMC of the electronic device.

In some embodiments, the electronic device may include a Basic Input Output System (BIOS), and the method may include acquiring, by the BIOS, the stored configuration information from the BMC if the BIOS of the electronic device is turned on.

In some embodiments, the method may further comprise: sending, by the BIOS, the configuration information of the disk array to a disk array driver through an interface.

In some embodiments, the configuration information may include at least one of a parameter of the disk array, an attribute of the parameter, or a format of the parameter. The method may further comprise: determining a type of the interface according to at least one of the parameter of the disk array, the attribute of the parameter, or the format of the parameter.

A second aspect of the present disclosure provides a related electronic device, which comprises a storage device configured to store configuration information of a disk array; and a processor configured to acquire the stored configuration information in response to the electronic device being activated, and to configure the disk array according to the configuration information.

A third aspect of the present disclosure provides a computer-readable storage medium. The computer readable storage medium storing computer program instructions, when executed by one or more computer processors, the computer program instructions perform: storing configuration information of the disk array; acquire the stored configuration information in response to the electronic device being activated; and configure the disk array according to the configuration information.

Other aspects of the present disclosure can be understood by those skilled in the art in light of the descriptions, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

For a more complete understanding of the present disclosure and the advantages of the present disclosure, reference is now made to the following descriptions in reference to the accompanying drawings, in which.

DETAILED DESCRIPTION

Figure 1:
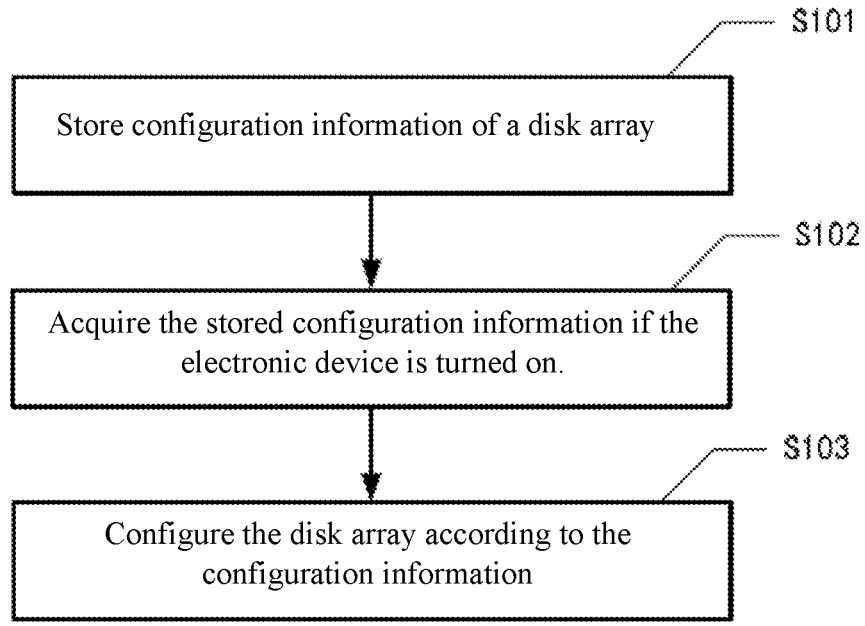
FIG. 1 schematically illustrates a flow diagram of a method for configuring a disk array of an electronic device according to a first embodiment of the present disclosure.

Hereinafter, embodiments of the present disclosure will be described with reference to the accompanying drawings. It should be understood, however, that these descriptions are merely for illustrative purposes and are not intended to limit the scope of the disclosure. In addition, in the following paragraphs, descriptions of well-known structures and techniques are omitted to avoid unnecessarily obscuring the concepts of the present disclosure.

The terminology used herein is for the purpose of describing particular embodiments only, and is not intended to limit the disclosure. The terms "a", "an" and "the" and the like, as used herein, should also include the meaning of "a plurality," "a variety of" unless the context clearly dictates otherwise. Furthermore, the terms "include," "include," and the like, as used herein, indicate the presence of stated features, steps, operations, and/or components, but do not preclude the presence or addition of one or more other features, steps, operations, or components.

All terms (including technical and scientific terms) used herein have the meaning as commonly understood by one of ordinary skill in the art, unless otherwise defined. It should be noted that terms used herein should be interpreted as having a meaning that is consistent with the context of the present descriptions and should not be interpreted in an idealized or overly stereotypical manner.

In relation to the drawings, a few block diagrams and/or flow charts are illustrated. It should be understood that certain blocks in the block diagrams and/or the follow charts, or combinations thereof may be implemented by computer program instructions. These computer program instructions may be provided to a processor of a general-purpose computer, special-purpose computer, or any other programmable data processing apparatus such that the instructions, when executed by the processor, enable the processor to implement the functions/operations illustrated in these block diagrams and/or flow charts.

Accordingly, the techniques of the present disclosure may be implemented in the form of hardware and/or software (including firmware, microcode, etc.). In addition, embodiments of the present disclosure may be in the form of computer program instructions stored in a computer readable medium. And the computer program instructions may be used by or in connection with an instruction execution system, such as a computer processor. In the context of the present disclosure, the computer readable medium may refer to any medium that can contain, store, communicate, propagate, or transport the instructions. For example, the computer readable media may include but are not limited to electrical, magnetic, optical, electromagnetic, infrared, or semiconductor systems, devices, devices, or transmission medium. Specific examples of the computer readable medium may include a magnetic storage device such as a magnetic tape or a hard disk (HDD); an optical storage device such as a compact disc (CD-ROM); a memory such as a random-access memory (RAM) or a flash memory; and/or wireless/wired communication link.

Redundant Array of Independent Disks (RAID), or a disk array, is a redundant array consisted of multiple independent disks. The disk array is often composed of a plurality of inexpensive disks combined into a large-capacity disk group.

There are three main types of disk arrays, external disk arrays, internal disk array cards, and virtual disk arrays by software emulation. The external disk arrays are most commonly used on servers of a large scale, which are with hot-swappable features. The internal disk array cards are inexpensive but may require a high level of installation skills. As a result, the internal disk array cards are suitable for use by skilled users such as technicians. The internal disk array cards are reliable, usable, and manageable. The virtual disk arrays by software emulation are generally implemented in servers of small data traffic volumes but are not suitable for servers handling large volumes of data traffic.

Users generally configure an array of disks. In some embodiments, when the users start a Basic Input Output System (BIOS) in the server, a BIOS interface is initiated. At this time, by pressing a specific combination of keys, the BIOS interface will bring up the configuration interface of the disk array. The users may implement a specific configuration of the disk array on the configuration interface. However, configuring the disk arrays for a large quantity of servers may take a lot of manpower and time, and the configuration is also prone to human errors.

One aspect of embodiments of the present disclosure provides a method for configuring a disk array of an electronic device, comprising: storing configuration information of the disk array; acquiring the stored configuration information if the electronic device is turned on; and configuring the disk array according to the configuration information.

It should be noted that the embodiments provided by the present disclosure may be applied to the above-identified three types of disk arrays but are not limited to the same.

FIG. 1 schematically shows a flow diagram of a method for configuring a disk array of an electronic device according to a first embodiment of the present disclosure.

As shown in FIG. 1, one embodiment of the present disclosure provides a method for configuring a disk array of an electronic device, which may include the following steps.

In step S101: The configuration system may store configuration information of the disk array.

In Step S102: The system may acquire the stored configuration information if the electronic device is turned on.

In Step S103: The system may configure the disk array according to the acquired configuration information.

According to one embodiment of the present disclosure, the step of storing the configuration information of the disk array in step S101 may be accomplished by a user remotely accessing the electronic device without requiring the user to operate locally on the electronic device. When a plurality of electronic devices is distributed in a plurality of different locations, the configuration information may be stored remotely from the plurality of electronic devices. Embodiments of the present disclosure reduce the workload of the user and improve operation efficiencies.

According to one embodiment of the present disclosure, after the electronic device is turned on in step S102, the electronic device may initiate powering on to perform a self-test. For example, components in the electronic device, such as a CPU, a motherboard, various interfaces, and the like may be detected. According to one embodiment of the present disclosure, in response to the electronic device being activated, a processor of the electronic device may be configured to acquire the stored configuration information.

Next, in step S103, the disk array may be configured according to the stored configuration information. Consistent with one embodiment of the present disclosure, the processor of the electronic device may configure the disk array according to the configuration information.

According to one embodiment of the present disclosure, the electronic device may include, but is not limited to, various servers such as an entry-level server, a workgroup server, a department-level server, an enterprise-level server, and the like. Consistent with some embodiments of the present disclosure, the electronic device may also include, but is not limited to, a terminal device such as a desktop, a laptop, a tablet, and the like.

According to one embodiment of the present disclosure, the above-disclosed method can remotely configure the disk arrays of a batch of electronic devices. By means of the method for configuring the disk arrays, it can reduce the workload, save time, and provide the high operation efficiency for the users.

Figure 2:
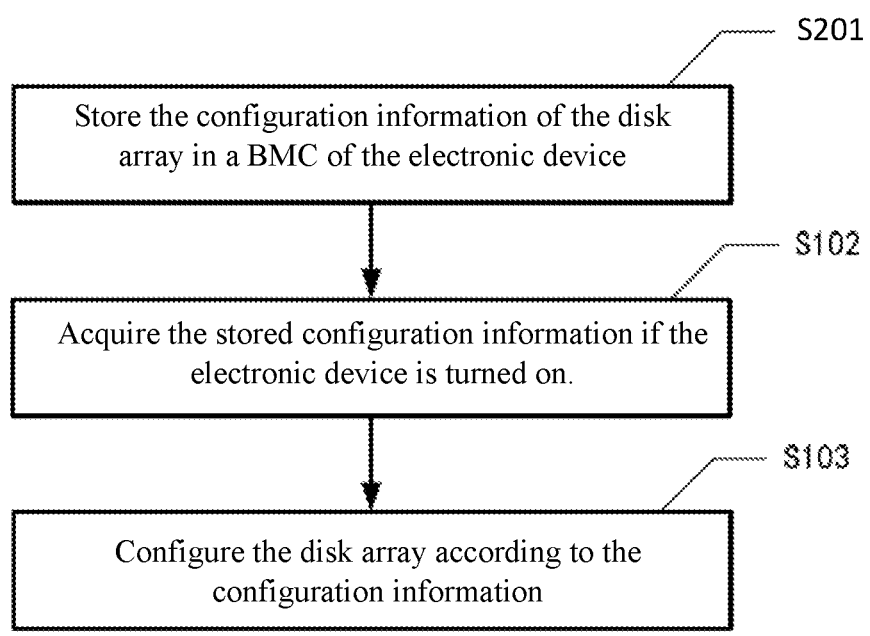
FIG. 2 schematically illustrates a flow diagram of a method for configuring a disk array of an electronic device according to a second embodiment of the present disclosure.

FIG. 2 schematically illustrates a flow diagram of a method for configuring a disk array of an electronic device according to a second embodiment of the present disclosure.

According to one embodiment of the present disclosure, the electronic device may include a Baseboard Management Controller (BMC). In a state in which the electronic device is not activated, the BMC may be configured to upgrade firmware of the electronic device and to detect operation status of the components in the electronic device. For example, the BMC can monitor the status of the electronic device system, reboot the electronic device, power back on, power down, etc. In one embodiment of the present disclosure, the BMC may be configured to store the configuration information of the disk array, and the BMC may be remotely accessed so that the configuration information can be remotely stored and provided to an electronic device as needed.

According to one embodiment of the present disclosure, step S101 in FIG. 1 may include step S201. Specifically, as shown in step S201 of FIG. 2, the configuration information of the disk array may be stored in the BMC of the electronic device.

According to one embodiment of the present disclosure, prior to step S201 being performed, the configuration information of the disk array may be encapsulated as one file and then step S201 may be executed to send the file containing the configuration information of the array disk to the BMC. The BMC can obtain and store the file.

In the embodiment, a plurality of electronic devices can be accessed and/or in a remote manner by means of the above storage method, thereby reducing the workload of the user and saving time for the user.

Figure 3:
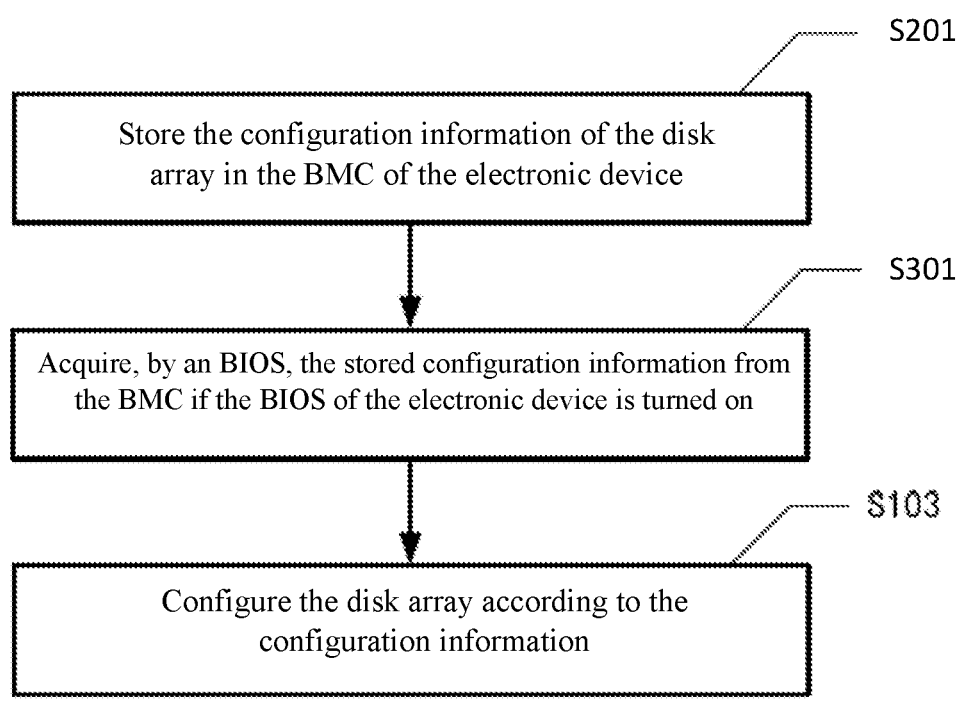
FIG. 3 schematically illustrates a flow diagram of a method for configuring a disk array of an electronic device according to a third embodiment of the present disclosure.

FIG. 3 schematically illustrates a flow diagram of a method for configuring a disk array of an electronic device according to a third embodiment of the present disclosure.

According to one embodiment of the present disclosure, the electronic device may include a Basic Input Output system (BIOS) which is a set of programs that is cured onto a ROM chip on the motherboard of the electronic device, and stores the most important and basic input and output procedures, post-boot self-test procedures, and system self-activation process. These procedures are configured to control the low level and most direct hardware settings and control parameters. In the present disclosure, in addition to the above-identified functions, the BIOS may be also configured to acquire the configuration information of the disk array from the BMC.

According to one embodiment of the present disclosure, step S102 in FIG. 1 may include step S301. Specifically, as shown in FIG. 3, the BIOS may be configured to acquire the configuration information from the BMC in response to the BIOS of the electronic device being started in step S301.

According to one embodiment of the present disclosure, a program cured on the BIOS chip is executed in step S301, the BIOS is started, and each component of the electronic device may be detected. When the BMC is detected, the BIOS may send a request instruction to the BMC, the BMC may respond to the request instruction and send an encapsulated file storing the configuration information of the disk array to the BIOS.

In one embodiment, by acquiring the configuring information of the disk array, the system can eliminate the need for the user to invoke the configuration interface of the disk array and set the configuration information of the disk array in the configuration interface. Accordingly, this brings more convenience for the user and saves time.

Figure 4:
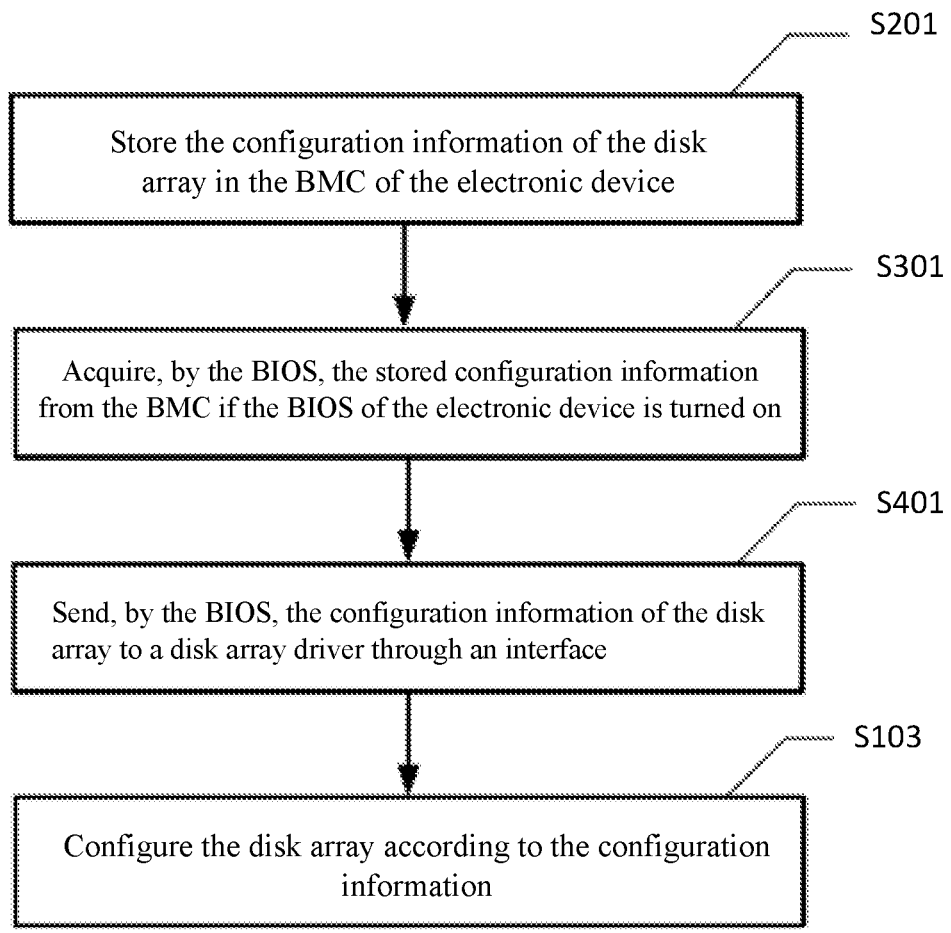
FIG. 4 schematically illustrates a flow diagram of a method for configuring a disk array of an electronic device according to a fourth embodiment of the present disclosure.

FIG. 4 schematically illustrates a flow diagram of a method for configuring a disk array of an electronic device according to a fourth embodiment of the present disclosure.

As shown in FIG. 4, based on one embodiment of the present disclosure, the above-identified method may include step S401. In step S401, the BIOS may be configured to send the configuration information of the disk array to a disk array driver through a preset interface.

According to one embodiment of the present disclosure, the preset interface in step S401 may include a software interface corresponding to the configuration information of the disk array. For example, it may be, but is not limited to, a format interface (for example, a JSON format interface) corresponding to the configuration information of the disk array, or the like.

According to one embodiment of the present disclosure, a driver may be configured to drive the disk array to run, unpack the encapsulated file as received, and perform self-configuration according to the unpacked configuration information. Embodiments of the present disclosure thus eliminate the need for excessive manual operations and improve the efficiencies of configuration processes.

Figure 5:
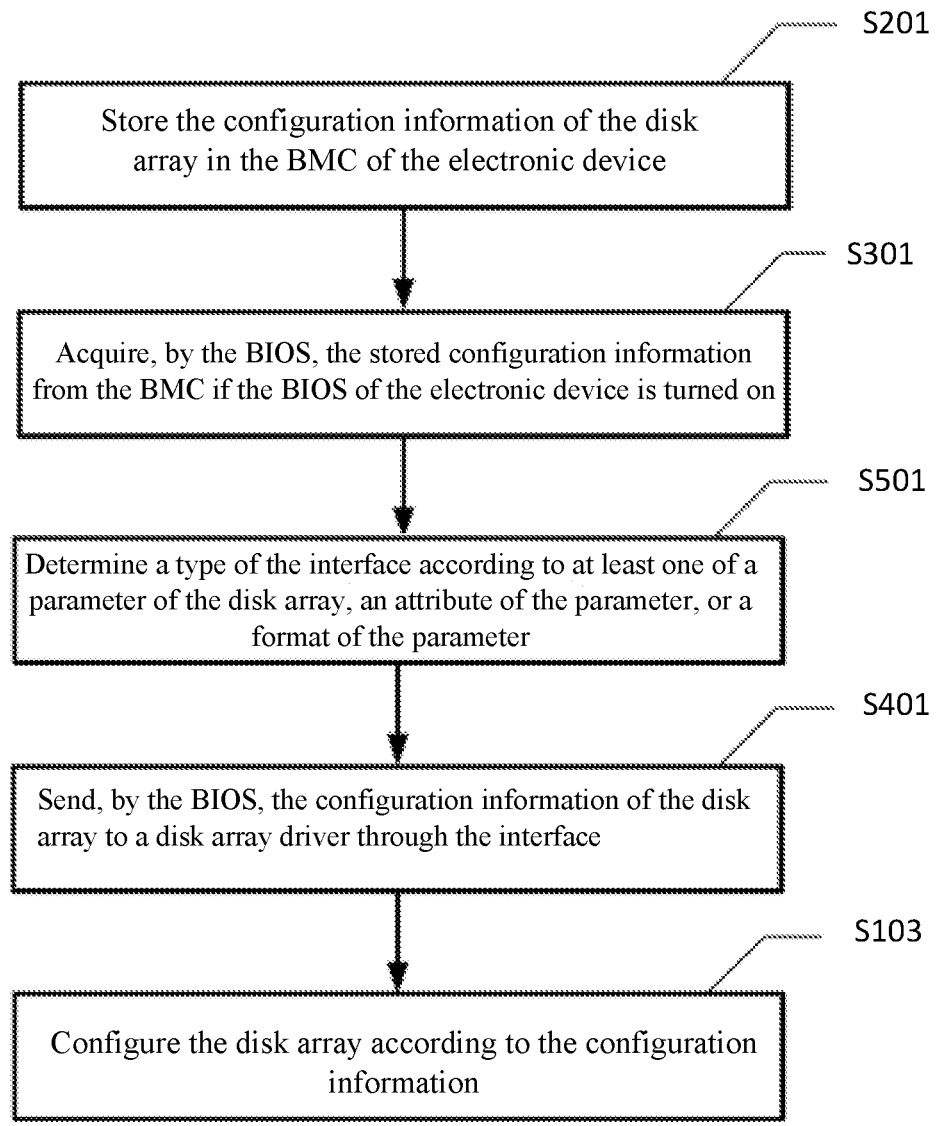
FIG. 5 schematically illustrates a flow diagram of a method for configuring a disk array of an electronic device according to a fifth embodiment of the present disclosure.

FIG. 5 schematically illustrates a flow diagram of a method for configuring a disk array of an electronic device according to a fifth embodiment of the present disclosure.

According to one embodiment of the present disclosure, the configuration information of the disk array may include at least one of a parameter of the disk array, an attribute of the parameter, or a format of the parameter.

According to one embodiment of the present disclosure, the above-identified method may include step S501. Specifically, as shown in step S501 of FIG. 5, a type of the preset interface may be determined according to the parameter of the disk array, the attribute of the parameter, and/or the format of the parameter.

In one embodiment of the present disclosure, the parameter of the disk array may include, but is not limited to, RAID 0, RAID 1, RAID 0+1 or RAID 5, etc. The attribute of RAID 0 may be no redundancy and no parity. The attribute of RAID 1 may be mirrored or backed up. The attribute of RAID 0+1 may combine the attributes of RAID 0 and RAID 1. The attribute of RAID 5 may be parity. The formats of RAID 0, RAID 1, RAID 0+1, or RAID 5 may generally refer to the formats of data stored on disk.

Figure 6A:
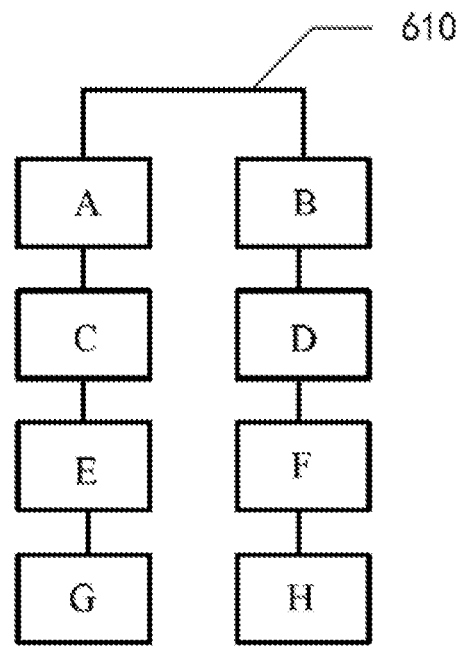
FIG. 6A shows a schematic structural diagram of a disk array RAID 0 according to one embodiment of the present disclosure.
Figure 6B:
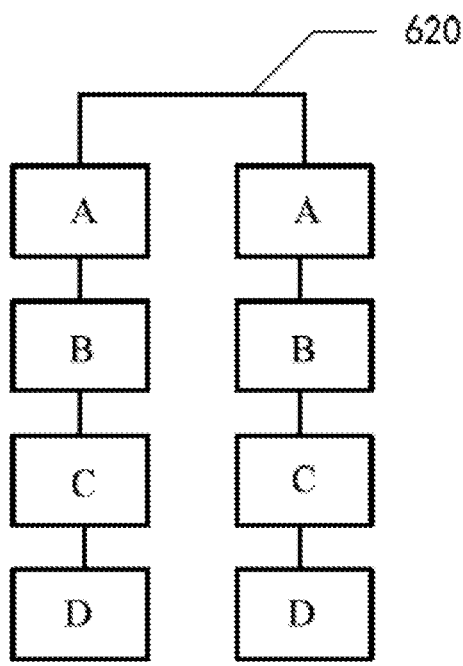
FIG. 6B shows a schematic structural diagram of a disk array RAID 1 according to one embodiment of the present disclosure.

Referring to FIG. 6A and FIG. 6B, the common RAID 0 and RAID 1 disk arrays will be further described with reference to specific structural diagrams.

As shown in FIG. 6A, the disk array RAID 0-610 may be a disk array with no redundancy and no parity. The stripping data of the disk array can be and distributed at the same time on any disk without fault tolerance. The read/write speed is the fastest among all types of the disk arrays. However, once any disk is damaged, the entire disk array will fail. Therefore, the disk array has a low safety factor and is generally used in applications where the data security is not an issue, but speed is a concern, such as, but not limited to, a large-scale computer game, graphic image editing, etc. The disk array structure may require at least two disks. And the higher the number of disks is, the faster the transmission speed of data will be.

As shown in FIG. 6B, the disk array RAID 1-620 may be a mirrored disk array. Each disk in the disk array may have a mirrored disk. The mirrored disk stores the real-time data consistent with the data in the original disk. Therefore, the data storage in RAID 1-620 may be with high security, but only with half of the disk space is really used to store data. For that reason, a mirrored disk array is generally used in an occasion in which high data security is required, such as, but not limited to, a disk array for storing archival data or financial statements, etc.

In this embodiment, those skilled in the art may understand that the parameter of the disk array is not limited to RAID 0, RAID 1, RAID 0+1 or RAID 5. Any other structural parameter may be configured according to the method of the present disclosure.

According to one embodiment of the present disclosure, for RAID 0, RAID 1, RAID 0+1, or RAID 5 disk arrays, the type of the interface used by the disk array driver to receive the configuration information may be determined according to the data format of the data stored therein. For example, if the data format of the stored data is JSON format, the interface used by the disk array driver to receive configuration information may be a JSON format interface.

Figure 7:
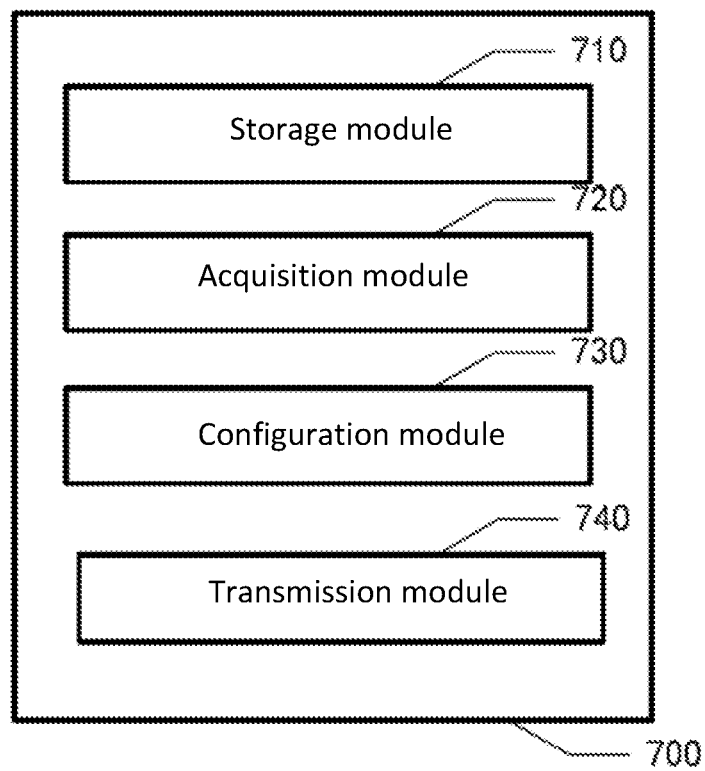
FIG. 7 schematically shows a block diagram of a system for configuring a disk array of an electronic device according to an embodiment of the present disclosure.

FIG. 7 schematically shows a block diagram of a system for configuring a disk array of an electronic device according to an embodiment of the present disclosure.

As shown in FIG. 7, a system 700 for configuring a disk array of an electronic device according to an embodiment of the present disclosure may include a storage module 710, an acquisition module 720, and a configuration module 730. The system 700 may perform the methods described above with reference to FIGS. 1-5 to configure a disk array of an electronic device.

In one embodiment, the storage module 710 may be configured to store the configuration information of the disk array. The acquisition module 720 may be configured to acquire the stored configuration information in response to the electronic device being activated. The configuration module 730 may be configured to configure the disk array according to the configuration information.

According to one embodiment of the present disclosure, the step of storing the configuration information of the disk array in the storage module 710 may be accomplished by a user remotely accessing the electronic device without requiring the user to operate locally on the electronic device. When a plurality of electronic devices is distributed in a plurality of different locations, the configuration information may be stored remotely from the plurality of electronic devices. Embodiments of the present disclosure reduce the workload of the user and improve operation efficiencies.

According to one embodiment of the present disclosure, after the electronic device is turned on, through the acquisition module 720, the electronic device may initiate a powering on sequence to perform a self-test. For example, components in the electronic device, such as a CPU, a motherboard, various interfaces, and the like may be detected. According to one embodiment of the present disclosure, in response to the electronic device being activated, a processor of the electronic device may be configured to acquire the stored configuration information.

Next, through the configuration module 730, the disk array may be configured according to the configuration information. Consistent with one embodiment of the present disclosure, the processor of the electronic device may configure the disk array according to the configuration information According to one embodiment of the present disclosure, the electronic device may include, but is not limited to, various servers such as an entry-level server, a workgroup server, a department-level server, an enterprise-level server, and the like. Consistent with some embodiments of the present disclosure, the electronic device may also include, but is not limited to, a terminal device such as a desktop, a laptop, a tablet, and the like.

According to one embodiment of the present disclosure, the system 700 may be configured to perform the above method to remotely configure the disk arrays of a batch of electronic devices. By means of the method for configuring the disk array, it can reduce the workload, save time, and provide the high operating efficiency for the user.

According to one embodiment of the present disclosure, the system 700 may further include a transmission module 740. The transmission module 740 may be configured to send the configuration information of the disk array to a disk array driver through a preset interface.

According to one embodiment of the present disclosure, the driver may be configured to drive the disk array to run, unpack the encapsulated file as received, and perform self-configuration according to the unpacked configuration information without any manual operation, thereby improving the configuration efficiency.

It may be understood that the storage module 710, the acquisition module 720, the configuration module 730, and the transmission module 740 may be combined into one module, or any one of the modules may be divided into multiple modules. Alternatively, at least some of the functionality of one or more of these modules may be combined with at least some of the functionality of the other modules and implemented in one module. According to one embodiment of the present disclosure, at least one of the storage module 710, the acquisition module 720, the configuration module 730, and the transmission module 740 may be at least partially implemented on a hardware circuit such as a field programmable gate array (FPGA), a programmable logic array (PLA), a system on a chip, a system on a substrate, a system on package, an application specific integrated circuit (ASIC), or any other reasonable manner, either in software or firmware form, that the circuit can be integrated or packaged. It may be realized in appropriate combination of the three manners of software, hardware, and firmware. Alternatively, at least one of the storage module 710, the acquisition module 720, the configuration module 730, and the transmission module 740 may be at least partially implemented as computer program instructions that, when executed by a processor, cause the processor to perform the functions of the corresponding module.

Software logics and functions can be written in an appropriate language such as but not limited to C # or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

Figure 8:
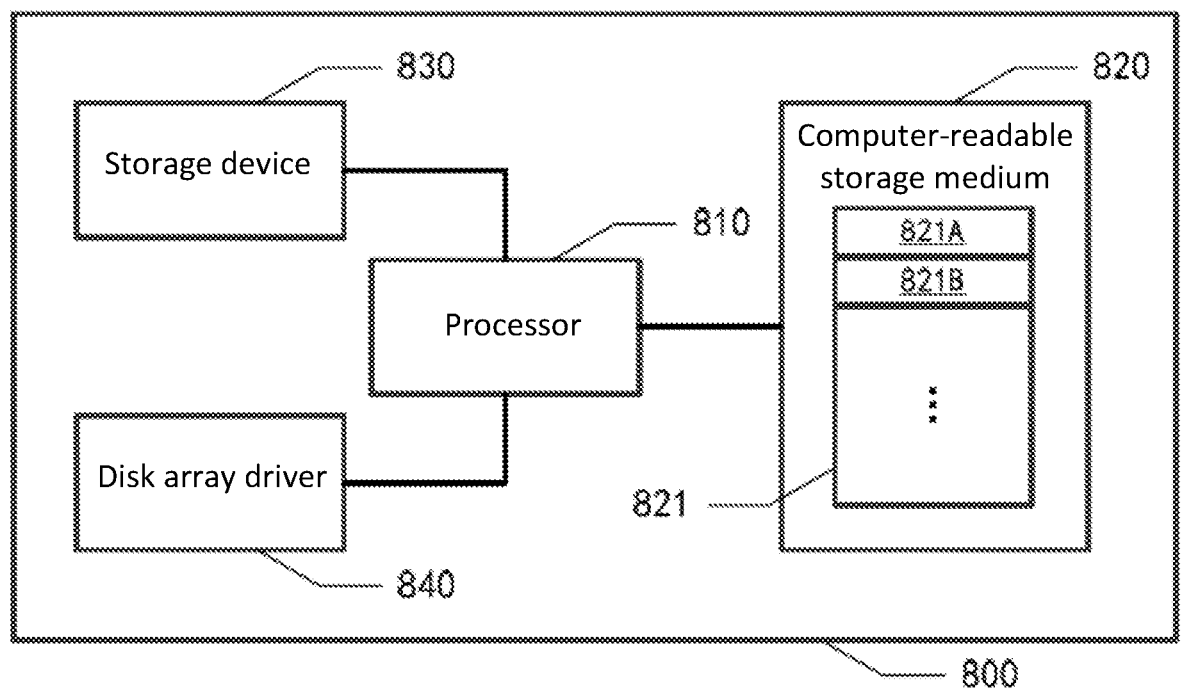
FIG. 8 schematically shows a block diagram of an electronic device according to one embodiment of the present disclosure.

FIG. 8 schematically shows a block diagram of an electronic device according to one embodiment of the present disclosure.

As shown in FIG. 8, the electronic device 800 may include a processor 810, a computer-readable storage medium 820, a storage device 830, and a disk array driver 840. The electronic device 800 may be configured to execute the methods described above with reference to FIG. 1 to FIG. 5 to implement configuring a disk array of the electronic device.

According to one embodiment of the present disclosure, the processor 810 may be configured to store configuration information of the disk array. In response the electronic device being started, the processor 810 may be configured to acquire the stored configuration information. And the processor 810 may be configured to configure the disk array according to the configuration information.

According to one embodiment of the present disclosure, the processor 810 may be configured to store the configuration information of the disk array by the user remotely accessing the electronic device without operating locally on the electronic device. When a plurality of electronic devices is distributed in a plurality of different locations, the configuration information can be stored remotely for the plurality of electronic devices. Embodiments of the present disclosure may thus reduce the workload of the user and improve operation efficiencies.

According to one embodiment of the present disclosure, after the electronic device is turned on, the electronic device may be configured to start powering on to perform a self-test. For example, components in the electronic device, such as a CPU, a motherboard, various interfaces, and the like may be detected. According to one embodiment of the present disclosure, in response to the electronic device being turned on, a processor of the electronic device may be configured to acquire the stored configuration information.

According to one embodiment of the present disclosure, the processor 810 may be configured to perform the above method to remotely configure the disk arrays of a batch of electronic devices. By means of the method for configuring the disk array, embodiments of the present disclosure can reduce the workload, save time, and provide the high working efficiency for the user.

According to one embodiment of the present disclosure, the processors 810 may be configured to drive the disk array driver to run, unpack the encapsulated file as received, and perform self-configuration according to the unpacked configuration information without any manual operation, thereby improving the configuration efficiency.

In some embodiments, the processor 810 may include, for example, a general-purpose microprocessor, an instruction set processor and/or an associated chipset and/or a special-purpose microprocessor, e.g., an application specific integrated circuit (ASIC), and the like. The processor 810 may also include an on-board memory for caching purposes. The processor 810 may include a single processing unit or a plurality of processing units for performing different operations of the method according to the embodiments of the present disclosure described with reference to FIG. 1 to FIG. 5.

The computer-readable storage medium 820, for example, may include any medium that can contain, store, communicate, propagate, or transport the instructions. For example, the readable storage media may include, but are not limited, to electrical, magnetic, optical, electromagnetic, infrared, or semiconductor systems, devices, devices, or propagation media. Specific examples of the readable storage medium may include a magnetic storage device such as a magnetic tape or a hard disk (HDD), an optical storage device such as a compact disk (CD-ROM); a memory such as random-access memory (RAM) or a flash memory, and/or wireless/wired communication link.

The computer-readable storage media 820 may include a computer program 821, which may include codes/computer-executable instructions that, when executed by the processor 810, cause the processor 810 to execute, for example, the methods described above with reference to FIG. 1 to FIG. 5, and any variation thereof.

The computer program 821 may be configured with computer program codes, including, for example, a computer program module. For example, in one embodiment, the codes in the computer program 821 may include one or more program modules including, for example, a module 821A, a module 821B . . . and so on. It should be noted that the division and the number of modules is not fixed, and those skilled in the art may implement appropriate program modules or any combination of program modules according to actual situations. When these program module combinations are executed by the processor 810, the processor 810 may be configured to, for example, execute the methods described above with reference to FIG. 1 to FIG. 5 and any variations thereof.

At least one of the storage module 710, the acquisition module 720, the configuration module 730, and the transmission module 740 according to one embodiment of the present disclosure may be implemented as a computer program module described with reference to FIG. 8 which, when executed by the processor 810, may be configured to realize the corresponding operations as described above.

Those skilled in the art should understand that, the features described in the embodiments and/or the claims of the present disclosure may be combined and/or jointed in various manners, even though such combinations and joints are not explicitly described in the present disclosure. In particular, the features recited in the various embodiments of the present disclosure and/or the claims may be combined and/or jointed in various ways without departing from the spirit and teachings of the present disclosure. All such combinations and/or joints are within the scope of this disclosure.

Although the present disclosure has been shown and described with reference to specific exemplary embodiments of the present disclosure, it will be understood by those skilled in the art that various modifications in form and/or characteristic may be made without departing from the spirit and scope of the present disclosure as defined by the appended claims and equivalences. Therefore, the scope of the present disclosure should not be limited to the above embodiments, but should be determined not only by the appended claims but also by equivalents of the appended claims.

Other embodiments of the disclosure will be apparent to those skilled in the art from consideration of the specification and practice of the disclosure provided herein. It is intended that the specification and examples be considered as exemplary only, with a true scope and spirit of the disclosure being indicated by the claims.

What is claimed is:

1. A method for configuring a disk array of an electronic device, comprising:
   storing configuration information of the disk array;
   acquiring the stored configuration information if the electronic device is turned on;
   sending the configuration information of the disk array to a disk array driver through an interface corresponding to the configuration information of the disk array; and
   configuring the disk array according to the configuration information.

2. The method of claim 1, wherein the electronic device includes a Baseboard Management Controller (BMC), and the method further includes storing the configuration information of the disk array in the BMC of the electronic device.

3. The method of claim 2, wherein the electronic device includes a Basic Input Output System (BIOS), and the method further includes acquiring, by the BIOS, the stored configuration information from the BMC.

4. The method of claim 3, further comprising: sending, by the BIOS, the configuration information of the disk array to the disk array driver through the interface.

5. The method of claim 4, wherein the configuration information includes at least one of a parameter of the disk array, an attribute of the parameter, or a format of the parameter.

6. The method of claim 5, further comprising: determining a type of the interface according to at least one of the parameter of the disk array, the attribute of the parameter, or the format of the parameter.

7. The method of claim 3, wherein the configuration information of the disk array is encapsulated in an encapsulated file.

8. The method of claim 7, further comprising:
sending the encapsulated file containing the configuration information of the disk array to the BMC; and
receiving and storing the encapsulated file by the BMC.

9. The method of claim 7, further comprising:
detecting the BMC and sending a request instruction to the BMC if the BIOS of the electronic is turned on; and
sending the encapsulated file containing the configuration information of the disk array to the BIOS.

10. The method of claim 9, further comprising:
unpack the encapsulated file containing the configuration information received by the BIOS; and
performing self-configuration according to the configuration information.

11. The method of claim 5, wherein the parameter of the disk array includes one of RAID 0, RAID 1, RAID 0+1, and RAID 5.

12. The method of claim 1, wherein the electronic device includes a server or a terminal device.

13. An electronic device, comprising:
a storage device storing configuration information of a disk array; and,
a processor acquiring the stored configuration information in response to the electronic device being turned on, sending the configuration information of the disk array to a disk array driver through an interface corresponding to the configuration information of the disk array, and configuring the disk array according to the configuration information.

14. The electronic device of claim 13, further comprising a Baseboard Management Controller (BMC), wherein the storage device is in the BMC.

15. The electronic device of claim 14, further comprising a Basic Input Output System (BIOS), wherein, in response to the BIOS of the electronic device being turned on, the processor acquires the configuration information through the BIOS from the BMC.

16. The electronic device of claim 15, wherein the BIOS sends the configuration information of the disk array to the disk array driver through the interface.

17. The electronic device of claim 16, wherein: the configuration information includes at least one of a parameter of the disk array, an attribute of the parameter, or a format of the parameter, and the processor determines a type of the interface according to at least one of the parameter of the disk array, the attribute of the parameter, or the format of the parameter.

18. A non-transitory computer-readable storage medium, the computer readable storage medium storing computer program instructions, when executed by one or more computer processors, the computer program instructions perform:
storing configuration information of the disk array;
acquire the stored configuration information in response to the electronic device being activated;
sending the configuration information of the disk array to a disk array driver through an interface corresponding to the configuration information of the disk array; and
configure the disk array according to the configuration information.

* * * * *